(12) United States Patent
Kawasaki et al.

(10) Patent No.: US 9,731,483 B2
(45) Date of Patent: Aug. 15, 2017

(54) COATED FILM

(71) Applicant: MITSUBISHI CHEMICAL CORPORATION, Tokyo (JP)

(72) Inventors: Yoichi Kawasaki, Maibara (JP); Taishi Kawasaki, Maibara (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/976,811

(22) Filed: Dec. 21, 2015

(65) Prior Publication Data

US 2016/0101606 A1    Apr. 14, 2016

Related U.S. Application Data

(63) Continuation-in-part of application No. PCT/JP2014/062135, filed on May 2, 2014.

(30) Foreign Application Priority Data

Jul. 16, 2013    (JP) .................................. 2013-147450

(51) Int. Cl.
| | | |
|---|---|---|
| B32B 27/36 | (2006.01) | |
| C08J 7/04 | (2006.01) | |
| B32B 27/08 | (2006.01) | |
| B32B 27/18 | (2006.01) | |
| B32B 27/20 | (2006.01) | |

(52) U.S. Cl.
CPC .............. *B32B 27/36* (2013.01); *B32B 27/08* (2013.01); *B32B 27/18* (2013.01); *B32B 27/20* (2013.01); *C08J 7/047* (2013.01); *B32B 2250/244* (2013.01); *B32B 2255/10* (2013.01); *B32B 2255/26* (2013.01); *B32B 2264/10* (2013.01); *B32B 2307/20* (2013.01); *B32B 2307/306* (2013.01); *B32B 2307/412* (2013.01); *B32B 2307/536* (2013.01); *B32B 2307/584* (2013.01); *B32B 2307/734* (2013.01); *B32B 2457/208* (2013.01); *B32B 2551/00* (2013.01); *C08J 2367/02* (2013.01); *C08J 2475/14* (2013.01)

(58) Field of Classification Search
CPC ..... B32B 27/08; B32B 27/36; B32B 2255/10; B32B 2255/26; C08J 7/047; C08J 2367/02; C08J 2475/14
See application file for complete search history.

(56) References Cited

U.S. PATENT DOCUMENTS

| | | | | |
|---|---|---|---|---|
| 8,771,833 B2* | 7/2014 | Kawasaki | ............ | C09D 175/06 428/423.1 |
| 2005/0222345 A1* | 10/2005 | Nakayama | .............. | C08L 67/02 525/419 |
| 2009/0117405 A1 | 5/2009 | Nashiki et al. | | |
| 2011/0141059 A1 | 6/2011 | Nashiki et al. | | |
| 2012/0094113 A1* | 4/2012 | Kawasaki | ............... | B32B 27/08 428/336 |
| 2012/0128969 A1* | 5/2012 | Kawasaki | ................ | C08J 7/047 428/336 |
| 2012/0128985 A1* | 5/2012 | Kawasaki | ............... | B32B 27/36 428/413 |
| 2012/0128986 A1* | 5/2012 | Kawasaki | ................ | C08J 7/047 428/413 |
| 2012/0177932 A1* | 7/2012 | Masuda | .................. | B32B 27/36 428/423.7 |
| 2012/0189831 A1* | 7/2012 | Kawasaki | ............. | G02B 1/105 428/216 |
| 2012/0189832 A1* | 7/2012 | Kawasaki | ............. | G02B 1/105 428/216 |
| 2012/0315465 A1* | 12/2012 | Kawasaki | .......... | G02B 27/0006 428/323 |
| 2012/0328868 A1* | 12/2012 | Kawasaki | ............... | B32B 27/08 428/327 |
| 2013/0004710 A1* | 1/2013 | Kawasaki | ................ | C09D 5/24 428/141 |

(Continued)

FOREIGN PATENT DOCUMENTS

| | | |
|---|---|---|
| JP | 2007-38448 | 2/2007 |
| JP | 2007-42473 | 2/2007 |

(Continued)

OTHER PUBLICATIONS

International Search Resort issued in PCT/JP2014/062135 dated Aug. 12, 2014.

(Continued)

*Primary Examiner* — Maria Veronica Ewald
*Assistant Examiner* — Travis Figg
(74) *Attorney, Agent, or Firm* — Nixon & Vanderhye P.C.

(57) ABSTRACT

According to the present invention, there is provide a coated film that can be highly prevented from suffering from deposition of oligomers from a surface of the film when exposed to a high temperature condition, and is excellent in adhesion property to various functional layers. The present invention relates to a coated film comprising a single-layer polyester film having an ester cyclic trimer content of not more than 0.7% by weight or a multilayer polyester film comprising a polyester surface layer having an ester cyclic trimer content of not more than 0.7% by weight, and a coating layer formed on at least one surface of the single-layer polyester film or multilayer polyester film, the coating layer being prepared from a coating solution comprising a crosslinking agent in an amount of not less than 70% by weight based on the weight of nonvolatile components in the coating solution.

16 Claims, No Drawings

(56) References Cited

U.S. PATENT DOCUMENTS

| | | | | |
|---|---|---|---|---|
| 2013/0011613 A1* | 1/2013 | Ota | ............... | C08J 7/047 428/143 |
| 2013/0052466 A1* | 2/2013 | Kato | ............... | C08J 7/047 428/412 |
| 2013/0078471 A1* | 3/2013 | Hiraki | ............... | C08G 18/0823 428/413 |
| 2013/0089730 A1* | 4/2013 | Kawasaki | ............... | C08J 7/047 428/336 |
| 2013/0105207 A1 | 5/2013 | Yamasaki et al. | | |
| 2013/0108864 A1* | 5/2013 | Kawasaki | ............... | G02B 1/105 428/336 |
| 2013/0122285 A1* | 5/2013 | Kawasaki | ............... | C09D 167/00 428/336 |
| 2013/0143033 A1* | 6/2013 | Kawasaki | ............... | B32B 27/36 428/328 |
| 2013/0337267 A1* | 12/2013 | Funatsu | ............... | G02B 1/105 428/412 |
| 2014/0242372 A1* | 8/2014 | Funatsu | ............... | B32B 27/36 428/220 |
| 2014/0322552 A1* | 10/2014 | Kawasaki | ............... | C08J 7/047 428/483 |
| 2014/0329101 A1* | 11/2014 | Kawasaki | ............... | B32B 27/36 428/480 |
| 2014/0356629 A1* | 12/2014 | Kato | ............... | G02B 1/111 428/413 |
| 2016/0101606 A1* | 4/2016 | Kawasaki | ............... | C08J 7/047 428/215 |

FOREIGN PATENT DOCUMENTS

| | | | | |
|---|---|---|---|---|
| JP | 2007-130955 | 5/2007 | | |
| JP | 2007-200823 | 8/2007 | | |
| JP | 2007-253512 | 10/2007 | | |
| JP | 2007-320144 | 12/2007 | | |
| JP | 2009-76432 | 4/2009 | | |
| JP | 2011-156687 | 8/2011 | | |
| JP | WO 2011132542 A1 * | 10/2011 | ......... | C08G 18/0823 |
| JP | 2013-86496 | 5/2013 | | |
| JP | 2013-94984 | 5/2013 | | |
| JP | 2013-107384 | 6/2013 | | |
| WO | WO 2011/122209 | 10/2011 | | |

OTHER PUBLICATIONS

International Preliminary Report on Patentability issued in PCT/JP2014/062135 dated Jan. 19, 2016.
Database WPI XP-002765074 for JP 2007-130955.
Extended European Search Resort issued in App. No. 14826416.1 dated Jan. 9, 2017.

* cited by examiner

COATED FILM

This application is a Continuation-In-Part of International Application No. PCT/JP2014/62135 filed 2 May 2014, which designated the U.S. and claims priority to JP Patent Application No. 2013-147450 filed 16 Jul. 2013, the entire contents of each of which are hereby incorporated by reference.

TECHNICAL FIELD

The present invention relates to a coated film, and more particularly, to a coated film comprising a polyester film as a base material which hardly suffers from deposition of oligomers thereon, for example, even after being exposed to a high temperature condition, and having an excellent adhesion property to various top-coating agents.

BACKGROUND ART

Polyester films have been used in various application fields because they are excellent in transparency, dimensional stability, mechanical properties, heat resistance, electrical properties, etc.

In particular, in recent years, the polyester films have been frequently used as a base material for transparent conductive laminates having an increasing demand for touch panels, in place of glass. In the transparent conductive laminates, an ITO (indium tin oxide) film is formed on a biaxially oriented polyester film as a base material directly or through an anchor layer by a sputtering method. Such a biaxially oriented polyester film is generally subjected to heat-processing.

For example, the biaxially oriented polyester film is allowed to stand at 150° C. for 1 hr to subject the film to low-temperature shrinking (Patent Document 1). Also, the biaxially oriented polyester film is subjected to treatments such as heat treatment at 150° C. for crystallization of ITO thereon (Patent Document 2).

However, the polyester film has such a problem that when subjected to such a high-temperature treatment for a long period of time, oligomers (low-molecular weight components of the polyester, in particular, an ester cyclic trimer thereof) included in the film are deposited and crystallized on a surface of the film, so that deterioration in visibility of the film owing to a whitened appearance thereof, defects in post-treatments, contamination of a process or members present in the process, etc., tend to occur. For these reasons, the transparent conductive laminates using the polyester film as a base material tend to hardly exhibit satisfactory properties.

As the measure for preventing deposition of the above oligomers, there has been proposed, for example, the method in which a cured resin layer comprising a cross-linked product of a silicone resin and an isocyanate-based resin is formed on a polyester film (Patent Document 3). However, since the cured resin layer of the polyester film is formed by heat-curing, it is required to subject the film to a high-temperature treatment in order to dissociate a blocking agent for the isocyanate-based resin. Thus, in the method, there tends to occur curling or sagging of the film in the course of processing, and therefore careful attention must be paid upon handling the film.

In consequence, when a coating layer is formed on the polyester film to take a measure for reducing an amount of oligomers deposited thereon, it is required that the coating layer thus formed has a still higher heat resistance than that of conventional ones, and also exhibits a good performance of preventing deposition of oligomers by itself.

Furthermore, the polyester films used, for example, for touch panels tend to be frequently subjected to hard coating process in order to enhance anti-curling property and scratch resistance of the film and improve properties such as surface hardness. For this reason, there is an increasing demand for polyester films comprising a coating layer that is excellent in adhesion property to the hard coat.

Also, there is known a transparent conductive film comprising a laminate constituted of two polyester films bonded to each other and a transparent electrode pattern formed on the laminate. When the transparent conductive film is used in resistive membrane touch panels, since the two polyester films therein are bonded to each other through an adhesive layer having a cushioning property, the obtained touch panels are enhanced in pen-inputting fastness and surface pressure fastness (Patent Literature 4). In addition, when the transparent conductive film is used in capacitance touch panels, the two polyester films can be bonded to each other through a cured adhesive layer. In such a case, it is possible to enhance touch sensitivity of the resulting touch panels and suppress undulation thereon (Patent Literature 5). For these reasons, it is presently necessary to provide polyester films comprising a coating layer that is excellent in adhesion property to the adhesive layer and the cured adhesive layer.

However, the conventional polyester films have failed to satisfy both a measure for reducing an amount of oligomers deposited thereon and good adhesion property to various functional layers to a sufficient extent.

CITATION LIST

Patent Literature

Patent Document 1: Japanese Patent Application Laid-Open (KOKAI) No. 2007-42473

Patent Document 2: Japanese Patent Application Laid-Open (KOKAI) No. 2007-200823

Patent Document 3: Japanese Patent Application Laid-Open (KOKAI) No. 2007-320144

Patent Document 4: Japanese Patent Application Laid-Open (KOKAI) No. 2009-76432

Patent Document 5: Japanese Patent Application Laid-Open (KOKAI) No. 2013-94984

SUMMARY OF INVENTION

Technical Problem

The present invention has been accomplished in view of the above conventional problems. An object of the present invention is to provide a coated film for optical purposes which is excellent in optical characteristics and visibility even after processing the film into a product for an optical member. More specifically, an object of the present invention is to provide a coated film which can exhibit less increase in film haze, for example, even after subjected to heat treatments at 150° C. for a long period of time, or subjected to steps under severe conditions such as sputtering steps under high tension conditions and durability tests under high-temperature and high-humidity conditions, and which is excellent in adhesion property to various functional layers.

Solution to Problem

As a result of the present inventors' earnest study in view of the above problems, it has been found that these problems can be solved by a polyester film having a specific structure. The present invention has been attained on the basis of this finding.

That is, in an aspect of the present invention, there is provided a coated film comprising:

a single-layer polyester film having an ester cyclic trimer content of not more than 0.7% by weight or a multilayer polyester film comprising a polyester surface layer having an ester cyclic trimer content of not more than 0.7% by weight, and a coating layer formed on at least one surface of the single-layer polyester film or multilayer polyester film, which coating layer is prepared from a coating solution comprising a crosslinking agent in an amount of not less than 70% by weight based on the weight of nonvolatile components in the coating solution.

Advantageous Effects of Invention

In accordance with the present invention, in order to highly suppress deposition of oligomers, by using combination of a polyester layer having a less ester cyclic trimer content and a coating layer having a specific composition which is formed on the polyester layer, it is possible to obtain the effect of considerably reducing deposition of an ester cyclic trimer thereon. In addition, it is possible to provide a base material film having an excellent adhesion property to various functional layers. Therefore, the present invention has a high utility value from industrial viewpoints.

DESCRIPTION OF EMBODIMENTS

The base material film used in the coated film of the present invention is formed of a polyester. The polyester may be produced by melt-polycondensing a dicarboxylic acid such as terephthalic acid, isophthalic acid, 2,6-naphthalenedicarboxylic acid, adipic acid, sebacic acid, 4,4'-diphenyldicarboxylic acid and 1,4-cyclohexyldicarboxylic acid or an ester of these acids with a glycol such as ethylene glycol, diethylene glycol, triethylene glycol, propylene glycol, 1,4-butanediol, neopentyl glycol and 1,4-cyclohexane dimethanol. The polyesters constituted of these acid components and glycol components may be produced by optionally using ordinary methods.

For example, there may be used the method in which first, a lower alkyl ester of an aromatic dicarboxylic acid and a glycol are subjected to transesterification reaction, or the aromatic dicarboxylic acid and the glycol are directly subjected to esterification reaction, to substantially form a bis-glycol ester of the aromatic dicarboxylic acid or an oligomer thereof, and then the obtained ester or oligomer is subjected to polycondensation by heating under reduced pressure. According to the aimed applications, an aliphatic dicarboxylic acid may also be copolymerized with the above components.

Typical examples of the polyester used in the present invention include polyethylene terephthalate, polyethylene 2,6-naphthalate and poly-1,4-cyclohexane dimethylene terephthalate, as well as those polyesters obtained by copolymerizing the above acid component or the above glycol component therewith. These polyesters may comprise other components or additives, if required.

The polymerization catalyst for production of the polyester is not particularly limited, and any suitable compounds conventionally known as the polymerization catalyst may be used therefor. Examples of the polymerization catalyst include an antimony compound, a titanium compound, a germanium compound, a manganese compound, an aluminum compound, a magnesium compound and a calcium compound. Of these compounds, the antimony compound has advantages such as inexpensiveness and a high catalytic activity. In addition, the titanium compound or the germanium compound is also preferably used because they exhibit a high catalytic activity, and are capable of conducting the polymerization even when used in a small amount, and enhancing a brightness of the obtained film owing to a less amount of the metal remaining in the film. Further, the use of the titanium compound is more preferably used because the germanium compound is expensive.

In the present invention, in order to reduce an amount of an ester cyclic trimer deposited on the film after subjected to heat treatment, it is essentially required to use the single-layer polyester film having an ester cyclic trimer content of not more than 0.7% by weight or the multilayer polyester film comprising a polyester surface layer having an ester cyclic trimer content of not more than 0.7% by weight.

The content of an ester cyclic trimer in polyester films used in general production processes is about 1% by weight. In the coated film of the present invention, the content of the ester cyclic trimer in the film is defined as being not more than 0.7% by weight when used in the above embodiments, whereby it is possible to highly exhibit the effect of preventing deposition of the ester cyclic trimer on a surface of the film. When the content of the ester cyclic trimer in the film is more than 0.7% by weight, there tends to arise such a problem that the film is deteriorated in film haze when used in high-temperature treatments for a long period of time or when subjected to processing steps under severe conditions, or the ester cyclic trimer is deposited on delivery rolls contacting with the film during the processing steps.

The content of the ester cyclic trimer in the polyester film used in the present invention is preferably not more than 0.6% by weight, and more preferably not more than 0.5% by weight. As the method for producing the polyester having a less ester cyclic trimer content, there may be used various known methods. For example, there may be mentioned the method in which the polyester is subjected to solid state polymerization after production thereof. In the method, it is possible to reduce the ester cyclic trimer content of the polyester by prolonging the solid state polymerization time.

The production of the polyester having a reduced ester cyclic trimer content requires high costs. Therefore, it is advantageous that the control of the ester cyclic trimer content of the film to not more than 0.7% by weight is performed by using a polymer blend. In this case, it is preferred to use a polyester having an ester cyclic trimer content of not more than 0.7% by weight. The amount of the polyester blended is usually not less than 70% by weight, and preferably not less than 80% by weight. The lower limit of the ester cyclic trimer content of the polyester used in the polymer blend is usually 0.1% by weight, and preferably 0.2% by weight, from the viewpoint of costs.

The polyester film used in the present invention may have either a single layer structure or a multi-layer structure. The polyester film having a multi-layer structure is more advantageous from the viewpoint of costs, because it is satisfactory to use the polyester having an ester cyclic trimer content of not more than 0.7% by weight in a surface layer thereof only. In addition, in the polyester film having a multilayer structure, surface layers and inner layers of the film, or both surface layers and respective layers of the film may be constituted of various different kinds of polyesters according to aimed applications thereof.

The polyester film may be designed to have a 2-kind/3-layer multilayer structure in which a polyester raw material having a less ester cyclic trimer content is used in respective surface layers of the multilayer polyester film, whereby it is possible to reduce an amount of the ester cyclic trimer in the film after subjected to heat treatments.

In addition, in the multilayer polyester film, the thickness of the polyester layer having an ester cyclic trimer content of not more than 0.7% by weight is preferably large, since it is possible to effectively suppress deposition of the ester cyclic trimer from the polyester film. The thickness of the polyester layer having an ester cyclic trimer content of not more than 0.7% by weight is preferably not less than 1.5 μm, more preferably not less than 2.0 μm, and still more preferably not less than 2.5 μm. When the thickness of the polyester layer having an ester cyclic trimer content of not more than 0.7% by weight is less than 1.5 μm, the polyester film tends to suffer from increased film haze when subjected to heat treatments at 150° C. for a long period of time, or subjected to processing steps under severe conditions such as sputtering steps under high tension-applying conditions and durability tests under high-temperature and high-humidity conditions, and therefore tends to be unsuitable as an optical member in view of optical characteristics and visibility thereof when processing the film into a product for an optical member.

The polyester film may also comprise particles for the purposes of ensuring a good traveling property of the resulting film and preventing occurrence of flaws thereon, etc. Examples of the particles include inorganic particles such as silica, calcium carbonate, magnesium carbonate, calcium phosphate, kaolin, talc, aluminum oxide, titanium oxide, alumina, barium sulfate, calcium fluoride, lithium fluoride, zeolite and molybdenum sulfide; and organic particles such as crosslinked polymer particles and calcium oxalate. Further, there may also be used deposited particles obtained by precipitating and finely dispersing a part of metal compounds such as a catalyst during the process for production of the polyester.

On the other hand, the shape of the particles used is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The particle diameter and content of the particles used in the polyester film may be selected and determined according to the aimed applications and objects of the resulting film. The average particle diameter (d50) of the particles is usually in the range of not more than 3 μm, preferably 0.02 to 2.8 μm, and more preferably 0.03 to 2.5 μm. When the average particle diameter of the particles is more than 3 μm, the resulting film tends to exhibit an excessively high surface roughness, or the particles tend to fall off from the surface of the film.

The content of the particles in the polyester film is usually in the range of not more than 3% by weight, preferably 0.0003 to 1% by weight, and more preferably 0.0005 to 0.5% by weight based on the weight of the polyester layer comprising the particles. When the polyester film comprises no particles or a less amount of the particles, although the resulting film has a high transparency and therefore provides a good film, the film tends to be insufficient in easy-slip property. As a result, it might be necessary to take another measure such as the measure of incorporating the particles into a coating layer of the film to enhance an easy-slip property of the film. On the other hand, when the content of the particles added to the polyester film is more than 3% by weight, the resulting film tends to be insufficient in transparency.

The method of adding the particles in the polyester layer is not particularly limited, and any conventionally known methods can be suitably used therefor. For example, the particles may be added at any optional stages in the process for production of the polyester constituting the respective layers. The particles are preferably added to the polyester after completion of the esterification reaction or transesterification reaction.

Meanwhile, the above polyester film may also comprise, in addition to the above particles, known additives such as an antioxidant, an ultraviolet absorber, a thermal stabilizer, a lubricant, a dye, a pigment, etc., if required.

The thickness of the polyester film is not particularly limited, and the polyester film may have any thickness as long as it can be produced while maintaining a suitable film shape. The thickness of the polyester film is usually in the range of 10 to 300 μm, preferably 15 to 250 μm, and more preferably 20 to 200 μm.

Meanwhile, the coated film of the present invention preferably has a haze of not more than 10%, more preferably not more than 5%, and still more preferably not more than 4%. When the haze of the coated film is more than 10%, the resulting film tends to become unusable in view of its appearance when used in the applications of optical films.

The method of forming the film as used in the present invention is not particularly limited, and there may be adopted generally known film-forming methods. For example, a sheet obtained by melt-extrusion of the polyester is first drawn in one direction thereof at a temperature of 70 to 145° C. at a draw ratio of 2 to 6 times by a roll drawing method to obtain a monoaxially drawn polyester film. Next, the thus obtained monoaxially drawn polyester film is drawn within a tenter in the direction perpendicular to the previous drawing direction at a temperature of 80 to 160° C. at a draw ratio of 2 to 6 times and further subjected to heat-setting at a temperature of 150 to 250° C. for 1 to 600 sec to obtain the aimed film. Furthermore, when subjected to the heat-setting, in the heat-setting zone and/or a cooling zone located at an outlet of the heat-setting zone, the resulting film is preferably subjected to relaxation within 20% in a longitudinal direction and/or a lateral direction thereof.

The coating layer may be provided by either a so-called off-line coating method in which the coating layer is formed on the polyester film subsequently to completion of formation of the polyester film, or a so-called in-line coating method in which the coating layer is formed during formation of the polyester film. Of these methods, preferred is the in-line coating method, in particular, there is more preferably used a coating/drawing method in which the film is drawn after the coating step.

The in-line coating method is a method in which the coating step is carried out during the process for production of the polyester film, more specifically, such a method in which the coating step is carried out in an optional stage from melt-extrusion of the polyester up to taking-up of the film through the drawing and heat-setting steps. In general, any of the substantially amorphous undrawn sheet obtained by melting and rapidly cooling the polyester, the monoaxially drawn film obtained by drawing the undrawn sheet, the biaxially oriented film before the heat-setting, or the film after the heat-setting but before the taking-up may be subjected to the coating step. For example, when the film is produced by a sequential biaxial drawing method, the method in which the monoaxially drawn film obtained by drawing the undrawn sheet in a longitudinal direction (length direction) thereof is subjected to the coating step, and then the resulting coated monoaxially drawn film is further drawn in a lateral direction thereof is more excellent, though not particularly limited thereto. The above method has merits in view of production costs because formation of the film and coating for forming the coating layer can be performed at the same time. In addition, since the drawing is carried out after completion of the coating, it is possible to form a uniform thin coating layer, resulting in stable properties of the resulting coating layer. Also, the polyester film before being biaxially drawn is first covered with a resin layer constituting the coating layer and then the polyester film and the coating layer are drawn at the same time, so that adhesion between the base material film and the coating layer can be strengthened. Further, upon the biaxial drawing of the polyester film, the film is drawn in a lateral direction thereof while grasping end portions of the film with tenter clips, etc., and therefore constrained in both the longitudinal and lateral directions thereof. This allows the polyester film to be exposed to high temperature while keeping a flatness thereof without formation of wrinkles, etc., when subjected to heat-setting. Therefore, the temperature used in the heat treatment to be conducted after the coating can be increased up to a high temperature which has not been reached in the other conventional methods, so that the film-forming property of the coating layer can be enhanced, and the adhesion between the coating layer and the polyester film can be strengthened. Upon production of the polyester film provided thereon with the coating layer, uniformity of the coating layer, improvement in film-forming property thereof and good adhesion between the coating layer and the film will result in desired properties of the resulting film in many cases.

In the coating/drawing method, the coating solution used for forming the coating layer is preferably in the form of an aqueous solution or a water dispersion from the viewpoints of easiness of handling, suitable working environments and safety. However, the coating solution may also comprise an organic solvent in such a range as not to deviate from the scope of the present invention as long as a main medium of the coating solution is water.

It is essentially required that the coated film of the present invention comprises a coating layer that is prepared from a coating solution comprising a crosslinking agent in an amount of not less than 70% by weight based on the weight of nonvolatile components in the coating solution. Meanwhile, the coating solution may also comprise the other components in addition to the aforementioned components.

As the crosslinking agent, there may be used various known crosslinking agents. Examples of the crosslinking agent include an oxazoline compound, a melamine compound, an epoxy compound, an isocyanate-based compound, a carbodiimide-based compound and a silane coupling compound. Of these compounds, in view of enhancing an adhesion durability of the coating layer, in particular, when forming a functional layer on the coating layer, an oxazoline compound may be more suitably used. Further, in view of preventing deposition of the ester cyclic trimer on a surface of the film owing to heating and improving a durability or a coatability of the coating layer, a melamine compound can be suitably used.

The preferred oxazoline compounds are, in particular, polymers having an oxazoline group, which may be obtained in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of industrial availability thereof. The other monomers used in the copolymer are not particularly limited as long as they are monomers that are copolymerizable with the addition-polymerizable oxazoline group-containing monomer. Examples of the other monomers include (meth)acrylic acid esters such as alkyl(meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl (meth)acrylamides and N,N-dialkyl(meth)acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The amount of an oxazoline group in the oxazoline compound included in the coating solution is usually in the range of 0.5 to 10 mmol/g, preferably 3 to 9 mmol/g, and more preferably 5 to 8 mmol/g. When the amount of an oxazoline group in the oxazoline compound lies within the above-specified range, the resulting coating film can be improved in durability.

Examples of the melamine compound usable in the present invention include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by subjecting a urea or the like to co-condensation with a part of melamine. Further, a catalyst may also be used to enhance a reactivity of the melamine compound.

Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

The isocyanate-based compound is a compound having an isocyanate derivative structure such as typically an isocyanate and a blocked isocyanate. Examples of the isocyanate include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as $\alpha,\alpha,\alpha',\alpha'$-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. Further examples of the isocyanate include polymers and derivatives of biuret compounds, isocyanurate compounds, uretdione compounds, carbodiimide-modified compounds or the like of these isocyanates. These isocyanates may be used alone or in combination of any two or more thereof. Of these isocyanates, in view of avoiding yellowing due to irradiation with ultraviolet rays, aliphatic isocyanates and alicyclic isocyanates are more suitably used as compared to aromatic isocyanates.

When the isocyanate-based compound is used in the form of a blocked isocyanate, examples of blocking agents used for production thereof include bisulfites; phenol-based compounds such as phenol, cresol and ethyl phenol; alcohol-based compounds such as propylene glycol monomethyl ether, ethylene glycol, benzyl alcohol, methanol and ethanol; active methylene-based compounds such as methyl isobutanoyl acetate, dimethyl malonate, diethyl malonate, methyl acetoacetate, ethyl acetoacetate and acetyl acetone; mercaptan-based compounds such as butyl mercaptan and dodecyl mercaptan; lactam-based compounds such as $\epsilon$-caprolactam and $\delta$-valerolactam; amine-based compounds such as diphenyl aniline, aniline and ethylene imine; acid amide compounds such as acetanilide and acetic acid amide; and oxime-based compounds such as formaldehyde, acetaldoxime, acetone oxime, methyl ethyl ketone oxime and cyclohexanone oxime. These blocking agents may be used alone or in combination of any two or more thereof.

In addition, the isocyanate-based compounds may be used in the form of a single substance or in the form of a mixture with various polymers or a bonded product therewith. The isocyanate-based compounds are preferably used in the form of a mixture or a bonded product with polyester resins or urethane resins from the standpoint of improving a dispersibility or a crosslinkability of the isocyanate-based compounds.

The carbodiimide-based compound is preferably in the form of a polycarbodiimide-based compound having two or more carbodiimide structures in a molecule thereof in view of a good adhesion property or the like of the resulting coating layer.

The carbodiimide-based compound may be synthesized by conventionally known techniques. In general, the carbodiimide-based compound may be obtained by a condensation reaction of a diisocyanate compound. The diisocyanate compound is not particularly limited, and may be either an aromatic diisocyanate or an aliphatic diisocyanate. Specific examples of the diisocyanate compound include tolylene diisocyanate, xylene diisocyanate, diphenylmethane diisocyanate, phenylene diisocyanate, naphthalene diisocyanate, hexamethylene diisocyanate, trimethyl hexamethylene diisocyanate, cyclohexane diisocyanate, methyl cyclohexane diisocyanate, isophorone diisocyanate, dicyclohexyl diisocyanate and dicyclohexylmethane diisocyanate.

The content of a carbodiimide group in the carbodiimide-based compound is usually in the range of 100 to 1000, preferably 250 to 700, and more preferably 300 to 500, in terms of a carbodiimide equivalent (a weight [g] of the carbodiimide-based compound providing 1 mol of a carbodiimide group). When the content of a carbodiimide group in the carbodiimide-based compound used lies within the above-specified range, the resulting coating film can be improved in durability.

Further, in order to improve a water solubility or a water dispersibility of the polycarbodiimide-based compound, a surfactant or a hydrophilic monomer such as a polyalkyleneoxide, a quaternary ammonium salt of a dialkylamino alcohol and a hydroxyalkyl sulfonic acid salt may be added thereto unless the addition thereof eliminates the effects of the present invention.

These crosslinking agents may be used alone or in combination of any two or more thereof. However, it has been found that when using two or more kinds of crosslinking agents in combination with each other, it is possible to improve both adhesion property to functional layers and anti-deposition property of the ester cyclic trimer after heating which have been hardly satisfied at the same time in the conventional arts. Among them, combination of the oxazoline compound capable of improving adhesion property to functional layers and the melamine compound having a good anti-deposition property of the ester cyclic trimer after heating is optimum and preferable.

In addition, it has been found that in order to further enhance adhesion property to functional layers, it is effective to use combination of three or more kinds of crosslinking agents. The optimum combination of the three or more kinds of crosslinking agents include such a combination in which a melamine compound is selected as one of the crosslinking agents. As the particularly preferred combination of the crosslinking agents including the melamine compound, there may be mentioned combination of the melamine compound with an oxazoline compound and an epoxy compound, and combination of the melamine compound with a carbodiimide-based compound and an epoxy compound.

Meanwhile, these crosslinking agents are used for improving a performance of the coating layer by allowing the crosslinking agents to react with the compounds contained therein during a drying step or a film-forming step thereof. Therefore, it is estimated that the resulting coating layer comprises the unreacted crosslinking agent, compounds obtained after the reaction, or a mixture thereof.

In the case where such a crosslinking component is incorporated in the coating solution, a crosslinking promoting component, for example, a crosslinking catalyst, may be simultaneously used in combination therewith.

In addition, upon forming the coating layer, polymers can be used in the coating layer for enhancing a coating appearance, an adhesion property to functional layers when they are formed on the coating layer, and the like.

Specific examples of the polymers include polyester resins, acrylic resins, urethane resins, polyvinyl resins (such as polyvinyl alcohol), polyalkylene glycols, polyalkylene imines, methyl cellulose, hydroxy cellulose, starches, etc. Among these polymers, in view of improving an adhesion property of the coating layer to various surface functional layers, preferred are polyester resins, acrylic resins and urethane resins. However, when the content of the polymer in the coating solution is increased, the resulting coating layer tends to be deteriorated in anti-deposition property of the ester cyclic trimer after heating. Therefore, the content of the polymer in the coating solution is usually not more than 30% by weight, preferably not more than 20% by weight, and more preferably not more than 10% by weight. When the content of the polymer in the coating solution is more than the above-specified range, it may be difficult to effectively suppress deposition of the ester cyclic trimer after heating.

Also, upon forming the coating layer, for the purpose of improving an anti-blocking property and a slipping property of the coating layer, particles may be used in combination therein. The average particle diameter of the particles is preferably in the range of not more than 1.0 μm, more preferably not more than 0.5 μm, and still more preferably not more than 0.2 μm from the viewpoint of a good transparency of the resulting film. In addition, in order to effectively enhance a slipping property, the lower limit of the average particle diameter of the particles is preferably not less than 0.01 μm, and more preferably not less than 0.03 μm, and still more preferably in the range larger than the thickness of the coating layer. Specific examples of the particles include silica, alumina, kaolin, calcium carbonate, organic particles or the like. Of these particles, preferred is silica from the viewpoint of a good transparency of the resulting coating layer.

Further, upon forming the coating layer, various additives such as a defoaming agent, a coatability improver, a thickening agent, an organic lubricant, an antistatic agent, an ultraviolet absorber, an antioxidant, a foaming agent, a dye and a pigment may also be used in combination, if required, unless the subject matter of the present invention is adversely affected by addition thereof to the coating layer.

The content of the crosslinking agent in the coating solution forming the coating layer is usually not less than 70% by weight, preferably not less than 80% by weight, and more preferably not less than 90% by weight based on a total amount of whole nonvolatile components in the coating solution. When the content of the crosslinking agent in the coating solution is less than the above-specified range, it may be difficult to effectively suppress deposition of the ester cyclic trimer after heating.

From the standpoint of suppressing deposition of the ester cyclic trimer after heating, melamine may be selected as one of the crosslinking agents. In such a case, the content of the melamine in the coating solution is usually in the range of 5 to 95% by weight, preferably 15 to 80% by weight, and more preferably 30 to 65% by weight based on a total weight of the whole crosslinking agents in the coating solution. When the content of the melamine in the coating solution is less than the above-specified range, it may be difficult to effectively suppress deposition of the ester cyclic trimer after heating. When the content of the melamine in the coating solution is more than the above-specified range, the resulting coating layer tends to be deteriorated in appearance.

The thickness of the coating layer in the finally obtained film is usually in the range of 0.003 to 1 μm, preferably 0.005 to 0.5 μm, and more preferably 0.01 to 0.2 μm. When the thickness of the coating layer is less than 0.003 μm, it might be difficult to reduce an amount of the ester cyclic trimer deposited which tend to be emerged from the film, to a sufficient extent. On the other hand, when the thickness of the coating layer is more than 1 μm, the resulting coating layer tends to be deteriorated in appearance, or the resulting film tends to suffer from problems such as blocking.

Examples of the coating method of applying the coating solution onto the polyester film include conventionally known coating methods such as an air doctor coating method, a blade coating method, a rod coating method, a bar coating method, a knife coating method, a squeeze coating method, an impregnation coating method, a reverse roll coating method, a transfer roll coating method, a gravure coating method, a kiss roll coating method, a cast coating method, a spray coating method, a curtain coating method, a calender coating method and an extrusion-coating method.

In order to improve a coatability and an adhesion property of the coating agent to the film, the film may be previously subjected to chemical treatments, corona discharge treatment, plasma treatment, etc., before coated therewith.

In some cases, it may be required that the coated film of the present invention has a high transparency even after exposed to a high-temperature atmosphere for a long period of time, for example, when used in the applications such as touch panels. From the viewpoints, in order to obtain the coated film having a high transparency, the amount of change in haze (ΔH) of the film when subjected to heat treatment (at 150° C. for 90 min) is usually not more than 1.0%, preferably not more than 0.7%, and more preferably not more than 0.3%. When ΔH is more than 1.0%, the resulting film tends to be deteriorated in visibility with the increase in film haze owing to deposition of the ester cyclic trimer thereon. As a result, the coated film tends to be unsuitable, for example, for use in the applications such as touch panels in which a high visibility is required.

In addition, from the viewpoint of reducing an amount of the ester cyclic trimer deposited, the coated film of the present invention is subjected to heat treatment (at 150° C. for 90 min), such that the amount of the ester cyclic trimer extracted from the surface of the film with dimethylformamide is controlled to usually not more than 1.2 mg/m$^2$, preferably not more than 1.0 mg/m$^2$, and more preferably not more than 0.8 mg/m$^2$. When the amount of the ester cyclic trimer extracted is more than 1.2 mg/m$^2$, the amount of the ester cyclic trimer deposited on the film tends to be increased when subsequently subjected to a heat treatment in a high-temperature atmosphere for a long period of time, for example, such a heat treatment conducted at 150° C. for 90 min, etc., so that the resulting film tends to be deteriorated in transparency, or there tends to occur such a fear that the process is severely contaminated.

EXAMPLES

The present invention is described in more detail below by Examples. However, these Examples are only illustrative and not intended to limit the present invention thereto, and other changes and modifications are possible unless they depart from the scope of the present invention.

Incidentally, the evaluating methods used in the following Examples and Comparative Examples are as follows.
(1) Method of Measuring Intrinsic Viscosity of Polyester:
One gram of a polyester was accurately weighed, and mixed and dissolved in 100 mL of a mixed solvent comprising phenol and tetrachloroethane at a weight ratio of 50:50, and a viscosity of the resulting solution was measured at 30° C.

(2) Method of Measuring Average Particle Diameter (d50; μm):

Using a centrifugal precipitation type particle size distribution measuring apparatus "SA-CP3 Model" manufactured by Shimadzu Corp., the particle size corresponding to a cumulative fraction of 50% (on a weight basis) in equivalent spherical distribution of the particles was measured as an average particle diameter of the particles.

(3) Method of Measuring Content of Ester Cyclic Trimer in Polyester Raw Material:

About 200 mg of the polyester raw material was weighed and dissolved in 2 mL of a mixed solvent comprising chloroform and HFIP (hexafluoro-2-isopropanol) at a mixing ratio of 3:2. After dissolving the raw material, 20 mL of chloroform was further added to the resulting solution, and then 10 mL of methanol was also added little by little thereto. The obtained reaction solution was subjected to filtration to remove a precipitate therefrom. Further, the resulting precipitate was washed with a mixed solvent comprising chloroform and methanol at a mixing ratio of 2:1 to recover a filtrate and the washing solution, followed by concentrating the obtained solution using an evaporator and then drying and solidifying the concentrated product. The resulting dried solid was dissolved in 25 mL of DMF (dimethylformamide), and the resulting solution was fed to a liquid chromatograph "LC-7A" manufactured by Shimadzu Corporation to measure an amount of an ester cyclic trimer in DMF. The obtained value was divided by the amount of the polyester raw material dissolved in the chloroform/HFIP mixed solvent to determine a content (% by weight) of the ester cyclic trimer therein. The amount of the ester cyclic trimer in DMF was determined from a peak area ratio between a peak area of a control sample and a peak area of the sample to be measured (absolute calibration curve method).

The control sample was prepared by accurately weighing a previously sampled ester cyclic trimer and dissolving the ester cyclic trimer in DMF accurately weighed.

Meanwhile, the operating conditions of the liquid chromatograph are as follows.

Mobile phase A: Acetonitrile
Mobile phase B: 2% Acetic acid aqueous solution
Column: "MCI GEL ODS 1HU" manufactured by Mitsubishi Chemical Corporation
Column temperature: 40° C.
Flow rate: 1 mL/min
Detection wavelength: 254 nm (4) Method of Calculating Content of Ester Cyclic Trimer in Polyester Film:

Calculated from the content of the ester cyclic trimer in the polyester raw material which was obtained by the above method (3).

(5) Thickness of Coating Layer:

The film was fixed in an embedding resin, and cut in section using a microtome. The cut film was dyed with 2% osmic acid at 60° C. for 2 hr to prepare a sample. The thus prepared sample was observed by a transmission electron microscope "JEM2010" available from Nippon Denshi Co., Ltd., to measure a thickness of the coating layer. The measurement of the thickness of the coating layer was conducted at 15 positions of the film in total, and an average value of the measured 9 thickness values except for the measured 3 larger thickness values from the maximum side and the measured 3 smaller thickness values from the minimum side was regarded as a thickness of the coating layer.

(6) Method for Heat Treatment of Film:

A Kent paper was overlapped and fixed on an exposed surface of the sample to be measured, and allowed to stand in a nitrogen atmosphere at 150° C. for 90 min to subject the sample to heat treatment.

(7) Measurement of Haze of Film:

The haze of the sample film was measured using a haze meter "HM-150" manufactured by Murakami Color Research Laboratory Co., Ltd., according to JIS K 7136.

(8) Measurement of Increase in Haze ($\Delta H$) of Film by Heat Treatment:

First, a coating agent having the following composition was applied onto a surface of the sample film opposed to its surface on which the coating layer of the present invention was provided, such that the thickness of the resulting coating layer after cured was 3 μm, and then dried in a hot air dryer-type oven set to 80° C. for 1 min. Next, the thus dried coating layer was irradiated with light from a distance 100 mm using a 120 W/cm energy high-pressure mercury lamp at an intensity of 110 mJ/cm$^2$ for about 7 sec to cure the coating layer, thereby obtaining a laminated film on which an active energy ray cured resin layer.

(Composition of Coating Agent)

A dilute solution prepared by diluting a mixture comprising an ultraviolet-curable urethane-acrylic resin "SHIKOH 7600B" produced by Nippon Synthetic Chemical Industry Co., Ltd., and a photopolymerization initiator "Irgacure 651" produced by Ciba Speciality Chemicals Corp., at a weight ratio of 100/5 with methyl ethyl ketone into a concentration of 30% by weight, was used as a coating agent.

The obtained sample was measured for its haze by the method described in the above (7) (haze 1).

Next, the surface of the sample to be measured which was opposed to its surface on which the active energy ray cured resin layer was provided was heated by the method described in the above (6), and then measured for its haze by the method described in the above (7) (haze 2).

$$\Delta H = (\text{haze2}) - (\text{haze1})$$

The lower $\Delta H$ indicates a less amount of oligomers deposited on the film when subjected to high-temperature treatment, and therefore exhibits a better result.

(9) Measurement of Amount of Ester Cyclic Trimer Deposited on Surface of Coated Film:

The polyester film was heated in air at 150° C. for 90 min. Thereafter, the polyester film thus heat-treated was formed into an open-topped rectangular box of 10 cm in each of length and width and 3 cm in height such that the surface to be measured (coating layer) faced inside. Next, 4 mL of DMF (dimethylformamide) was charged in the box formed in the above manner and allowed to stand therein for 3 min, and then recovered. The thus recovered DMF was fed to a liquid chromatograph "LC-7A" manufactured by Shimadzu Corp., to measure a content of an ester cyclic trimer in DMF. The thus obtained value was divided by an area of the film contacted with DMF to calculate an amount (mg/m$^2$) of the ester cyclic trimer deposited on the surface of the film. The content of the ester cyclic trimer in DMF was calculated according to the absolute calibration curve method described in the above method (3) of measuring the content of ester cyclic trimer in the polyester raw material.

(10) Method for Evaluating Adhesion Property:

An active energy ray curable resin having the following coating agent composition was applied onto a surface of a polyester film on which a coating film was formed, using a wire bar #16, and then dried at 80° C. for 1 min to remove a solvent therefrom. Thereafter, the thus dried resin was irradiated with an ultraviolet light from an ultraviolet irradiation device provided with a 120 W metal halide lamp at an intensity of 180 mJ/cm$^2$ to thereby form a 5 μm-thick hard coat layer. The surface of the resulting film was cut to form 100 cross-cuts using a cutter guide with a spacing of 1 mm. Next, a 18 mm-wide tape ("Cellotape (registered trademark) CT-18" produced by Nichiban Co., Ltd.) was attached onto the cut surface of the film on which the cross-cuts were formed, and then a 2.0 kg roller was placed on the tape and reciprocatively moved 20 times thereover to completely adhere to the film. Then, the tape was rapidly peeled off from the film at a peel angle of 180°, and the surface of the film from which the tape was peeled off was observed to measure an area of the hard coat layer peeled off together with the tape. The evaluation ratings are as follows.

A: Peeled area of the layer was less than 5%.

B: Peeled area of the layer was not less than 5% but less than 20%.

C: Peeled area of the layer was not less than 20% but less than 50%.

D: Peeled area of the layer was not less than 50%.

<<Composition of Active Energy Ray Curable Resin>>

A mixed coating solution comprising 72 parts by weight of dipentaerythritol acrylate, 18 parts by weight of 2-hydroxy-3-phenoxy propyl acrylate, 1 part by weight of a photopolymerization initiator ("Irgacure 651" produced by Ciba Specialty Chemicals Corp.) and 200 parts by weight of methyl ethyl ketone.

The polyesters used in the respective Examples and Comparative Examples were prepared as follows.

(Method of Producing Polyester (A))

One hundred parts by weight of dimethyl terephthalate and 60 parts by weight of ethylene glycol as starting materials were charged together with 0.09 part by weight of magnesium acetate tetrahydrate as a catalyst into a reaction vessel, and the reaction therebetween was initiated at 150° C. The reaction temperature was gradually raised while distilling off methanol, and allowed to reach 230° C. after 3 hr. After 4 hr, the transesterification reaction was substantially terminated. The obtained reaction mixture was mixed with 0.04 part of ethyl acid phosphate and then with 0.04 part of antimony trioxide. The resulting mixture was subjected to polycondensation reaction for 4 hr. More specifically, the reaction temperature was gradually raised from 230° C. until reaching 280° C. On the other hand, the reaction pressure was gradually reduced from normal pressure until finally reaching 0.3 mmHg. After initiation of the reaction, an agitation power in the reaction vessel was monitored, and the reaction was terminated at the time at which a viscosity of the reaction solution reached the value corresponding to an intrinsic viscosity of 0.63, which was determined by the change in agitation power in the reaction vessel. The resulting polymer was discharged under application of a nitrogen pressure from the reaction vessel. As a result, it was confirmed that the thus obtained polyester (A) had an intrinsic viscosity of 0.63 and an ester cyclic trimer content of 0.97% by weight.

(Method of Producing Polyester (B))

The polyester (A) was previously crystallized at 160° C., and then subjected to solid state polymerization at 220° C. in a nitrogen atmosphere, thereby obtaining a polyester (B) having an intrinsic viscosity of 0.75 and an ester cyclic trimer content of 0.46% by weight.

<Method for Producing Polyester (C)>

One hundred parts by weight of dimethyl terephthalate and 60 parts by weight of ethylene glycol as well as ethyl acid phosphate and magnesium acetate tetrahydrate as a catalyst in amounts of 30 ppm and 100 ppm, respectively, based on the polyester as produced, were subjected to esterification reaction at 260° C. in a nitrogen atmosphere. Successively, tetrabutyl titanate in an amount of 50 ppm based on the polyester as produced was added to the reaction solution. While heating the resulting mixture to 280° C. over 2 hr and 30 min, the pressure of the reaction system was reduced to an absolute pressure of 0.3 kPa, and further the mixture was subjected to melt-polycondensation for 80 min, thereby obtaining a polyester (C) having an intrinsic viscosity of 0.61 and an ester cyclic trimer content of 1.02% by weight.

(Method of Producing Polyester (D))

The polyester (C) was previously crystallized at 160° C., and then subjected to solid state polymerization at 210° C. in a nitrogen atmosphere, thereby obtaining a polyester (D) having an intrinsic viscosity of 0.72 and an ester cyclic trimer content of 0.50% by weight.

(Method of Producing Polyester (E))

The same procedure as described in the above production of the polyester (A) was conducted except that after adding 0.04 part of ethyl acid phosphate, 0.5 part of silica particles having an average particle diameter (d50) of 1.6 μm which were dispersed in ethylene glycol and 0.04 part of antimony trioxide were added to the resulting mixture, and the polycondensation reaction was terminated at the time at which a viscosity of the reaction solution reached the value corresponding to an intrinsic viscosity of 0.65, thereby obtaining a polyester (E). As a result, it was confirmed that the thus obtained polyester (E) had an intrinsic viscosity of 0.65 and an ester cyclic trimer content of 0.82% by weight.

Also, as the components to be incorporated in the coating solution, there were used was the following compounds.

(A1): Hexamethoxy methylol melamine.

(A2): Oxazoline compound "EPOCROSS" (produced by Nippon Shokubai Co., Ltd.; oxazoline group content: 7.7 mmol/g).

(A3): Oxazoline compound "EPOCROSS" (produced by Nippon Shokubai Co., Ltd.; oxazoline group content: 4.5 mmol/g).

(A4): Polyglycerol polyglycidyl ether.

(A5): Blocked polyisocyanate synthesized by the following method.

While stirring 1000 parts of hexamethylene diisocyanate at 60° C., 0.1 part of tetramethyl ammonium caprate as a catalyst was added thereto. After 4 hr, 0.2 part of phosphoric acid was added to the reaction mixture to terminate the reaction, thereby obtaining an isocyanurate-type polyisocyanate composition. Then, 100 parts of the resulting isocyanurate-type polyisocyanate composition, 42.3 parts of methoxy polyethylene glycol having a number-average molecular weight of 400 and 29.5 parts of propylene glycol monomethyl ether acetate were charged, and held at 80° C. for 7 hr. Thereafter, while maintaining the temperature of the reaction solution at 60° C., 35.8 parts of methyl isobutanoyl acetate, 32.2 parts of diethyl malonate and 0.88 part of a 28% methanol solution of sodium methoxide were added to the reaction solution, and the resulting reaction mixture was held for 4 hr. Then, 58.9 parts of n-butanol was added to the reaction mixture, and the obtained reaction solution was held at 80° C. for 2 hr. Thereafter, 0.86 part of 2-ethylhexyl acid phosphate was added to the reaction solution, thereby obtaining a blocked polyisocyanate.

(A6): Polycarbodiimide-based compound "CARBODILITE" (produced by Nisshinbo Chemical Inc.); carbodiimide equivalent: 340.

(B1): Water dispersion of acrylic resin having a glass transition point of 40° C. obtained by polymerizing the following composition:

Emulsion polymer (emulsifier: anionic surfactant) produced from ethyl acrylate/n-butyl acrylate/methyl methacrylate/N-methylol acrylamide/acrylic acid=65/21/10/2/2 (% by weight).

(B2): Water dispersion of a neutralized product obtained by neutralizing a polyester polyurethane constituted of 953 parts by weight of a polyester polyol (B2a) prepared from 315 parts by weight of terephthalic acid, 299 parts by weight of isophthalic acid, 74 parts by weight of ethylene glycol and 265 parts by weight of diethylene glycol; 267 parts by weight of isophorone diisocyanate; 56 parts by weight of ethylene glycol; and 67 parts by weight of dimethylol propionic acid, with ammonia (concentration: 23%; viscosity at 25° C.: 30 mPa·s).

(C1): Melamine crosslinking catalyst: 2-amino-2-methyl propanol hydrochloride.

(F1): Silica particles having an average particle diameter of 0.07 μm.

(F2): Alumina-modified silica particles having an average particle diameter of 0.02 μm.

Example 1

A mixture obtained by blending the polyesters (B) and (E) at a weight ratio of 80/20 as a raw material for surface layers, and the polyester (A) only as a raw material for an intermediate layer, were respectively charged into two extruders, heated and melted therein at 285° C., and then co-extruded therefrom into a two-kind/three-layer structure (A/B/A) in which the A layers were outermost layers (surface layers) and the B layer was an intermediate layer such that the thickness ratio A/B/A was 2.5/45/2.5, and while closely contacting with a mirror-finished chilled drum whose surface was controlled to a temperature of 40 to 50° C. by an electrostatic pinning method, the thus extruded sheet was cooled and solidified, thereby obtaining an undrawn polyethylene terephthalate film. Next, the thus obtained film was drawn at a draw ratio of 3.4 times in a longitudinal direction thereof while passing through a group of heated rolls at 85° C. by utilizing a difference between peripheral speeds of the rolls. Thereafter, an aqueous coating solution 1 shown in the below-mentioned Table 1 was applied on one surface of the thus obtained longitudinally drawn film. Then, the thus coated longitudinally drawn film was introduced into a tenter drawing machine in which the film was drawn at 100° C. at a draw ratio of 4.0 times in a lateral direction thereof and then subjected to heat-setting at 230° C. Then, the obtained drawn film was relaxed by 2% in a lateral direction thereof, thereby obtaining a biaxially oriented polyethylene terephthalate film having a thickness of 50 μm which was provided on the surface thereof with a coating layer having a thickness of 0.04 μm (after drying).

As a result, it was confirmed that the thus obtained polyester film exhibited good properties, i.e., a less increase in film haze (ΔH) and a less amount of the ester cyclic trimer deposited thereon owing to the heat treatment, and further exhibited good adhesion property. Properties of the thus obtained film are shown in Table 3 below.

Examples 2 to 23

The same procedure as in Example 1 was conducted except that the coating agent composition was changed as shown in Tables 1 and 2, thereby obtaining polyester films. As a result, it was confirmed that the obtained polyester films exhibited good properties as shown in Table 3 below, i.e., a less amount of the ester cyclic trimer deposited thereon owing to the heat treatment and good adhesion property.

Example 24

A mixture obtained by blending the polyesters (D) and (E) at a weight ratio of 80/20 as a raw material for surface layers, and the polyester (D) only as a raw material for an intermediate layer, were respectively charged into two extruders, heated and melted therein at 285° C., and then co-extruded therefrom into a two-kind/three-layer structure (A/B/A) in which the A layers were outermost layers (surface layers) and the B layer was an intermediate layer such that the thickness ratio A/B/A was 1.5/20/1.5, and while closely contacting with a mirror-finished chilled drum whose surface was controlled to a temperature of 40 to 50° C. by an electrostatic pinning method, the thus extruded sheet was cooled and solidified, thereby obtaining an undrawn polyethylene terephthalate film. Next, the thus obtained film was drawn at a draw ratio of 3.4 times in a longitudinal direction thereof while passing through a group of heated rolls at 85° C. by utilizing a difference between peripheral speeds of the rolls. Thereafter, an aqueous coating solution 7 shown in the below-mentioned Table 1 was applied on one surface of the thus obtained longitudinally drawn film. Then, the thus coated longitudinally drawn film was introduced into a tenter drawing machine in which the film was drawn at 100° C. at a draw ratio of 4.0 times in a lateral direction thereof and then subjected to heat-setting at 230° C. Then, the obtained drawn film was relaxed by 2% in a lateral direction thereof, thereby obtaining a biaxially oriented polyethylene terephthalate film having a thickness of 23 μm which was provided on the surface thereof with a coating layer having a thickness of 0.04 μm (after drying).

As a result, it was confirmed that the thus obtained polyester film exhibited good properties, i.e., a less increase in film haze (ΔH) and a less amount of the ester cyclic trimer deposited thereon owing to the heat treatment, and further exhibited good adhesion property. Properties of the thus obtained film are shown in Table 3 below.

Example 25

The same procedure as in Example 24 was conducted except that the thickness ratio A/B/A was changed to 2.5/45/2.5, and the thickness of the polyester film was changed to 50 μm, thereby obtaining a polyester film. Properties of the thus obtained polyester film are shown in Table 3 below.

Example 26

The same procedure as in Example 24 was conducted except that the thickness ratio A/B/A was changed to 5/115/5, and the thickness of the polyester film was changed to 125 μm, thereby obtaining a polyester film. Properties of the thus obtained polyester film are shown in Table 3 below.

As a result, it was confirmed that the thus obtained polyester film exhibited good properties, i.e., a less increase in film haze (ΔH) and a less amount of the ester cyclic trimer deposited thereon owing to the heat treatment, and further exhibited good adhesion property. Properties of the thus obtained film are shown in Table 3 below.

Comparative Example 1

A mixture obtained by blending the polyesters (A) and (E) at a weight ratio of 80/20 as a raw material for surface layers, and the polyester (A) only as a raw material for an intermediate layer, were respectively charged into two extruders, heated and melted therein at 285° C., and then co-extruded therefrom into a two-kind/three-layer structure (A/B/A) in which the A layers were outermost layers (surface layers) and the B layer was an intermediate layer such that the thickness ratio A/B/A was 2.5/45/2.5, and while closely contacting with a mirror-finished chilled drum whose surface was controlled to a temperature of 40 to 50° C. by an electrostatic pinning method, the thus extruded sheet was cooled and solidified, thereby obtaining an undrawn polyethylene terephthalate film. Next, the thus obtained film was drawn at a draw ratio of 3.4 times in a longitudinal direction thereof while passing through a group of heated rolls at 85° C. by utilizing a difference between peripheral speeds of the rolls. Thereafter, an aqueous coating solution 1 shown in the below-mentioned Table 1 was applied on one surface of the thus obtained longitudinally drawn film. Then, the thus coated longitudinally drawn film was introduced into a tenter drawing machine in which the film was drawn at 100° C. at a draw ratio of 4.0 times in a lateral direction thereof and then subjected to heat-setting at 230° C. Then, the obtained drawn film was relaxed by 2% in a lateral direction thereof, thereby obtaining a biaxially oriented polyethylene terephthalate film having a thickness of 50 μm which was provided on the surface thereof with a coating layer having a thickness of 0.04 μm (after drying).

As a result, it was confirmed that the thus obtained polyester film exhibited a large increase in film haze (ΔH) and a large amount of the ester cyclic trimer deposited thereon owing to the heat treatment, as well as had such a fear that it suffered from disadvantages such as contamination of the process and deterioration in visibility owing to whitening after heating. Properties of the thus obtained film are shown in Table 3 below.

Comparative Examples 2 to 4

The same procedure as in Comparative Example 1 was conducted except that in Comparative Example 1, the coating agent composition was changed as shown in Tables 1 and 2, thereby obtaining polyester films. As a result of evaluating the thus obtained coated films, it was confirmed that, as shown in Table 3, the coated films respectively obtained in Comparative Examples 2 to 4 exhibited a large increase in film haze and a large amount of the ester cyclic trimer deposited thereon owing to the heat treatment.

Comparative Examples 5 to 7

The same procedure as in Example 1 was conducted except that the coating agent composition was changed as shown in Tables 1 and 2, thereby obtaining polyester films. As a result of evaluating the thus obtained coated films, it was confirmed that, as shown in Table 3, the coated films respectively obtained in Comparative Examples 5 to 7 exhibited a large increase in film haze and a large amount of the ester cyclic trimer deposited thereon owing to the heat treatment.

Comparative Example 8

The same procedure as in Example 1 was conducted except that no coating layer was formed, thereby obtaining a polyester film. As a result of evaluating the thus obtained film, it was confirmed that the film exhibited a large increase in film haze and a large amount of the ester cyclic trimer deposited thereon owing to the heat treatment, as well as had such a fear that it suffered from disadvantages such as contamination of the process and deterioration in visibility owing to whitening after heating. The film obtained in Comparative Example 8 was deteriorated in adhesion property.

TABLE 1

| Coating solution | Coating agent composition based on nonvolatile components (%) | | | | | | | | | | |
|---|---|---|---|---|---|---|---|---|---|---|---|
| | A1 | A2 | A3 | A4 | A5 | A6 | B1 | B2 | C1 | F1 | F2 |
| 1 | 0 | 95 | 0 | 0 | 0 | 0 | 0 | 0 | 0 | 5 | 0 |
| 2 | 95 | 0 | 0 | 0 | 0 | 0 | 0 | 0 | 0 | 5 | 0 |
| 3 | 50 | 0 | 45 | 0 | 0 | 0 | 0 | 0 | 0 | 5 | 0 |
| 4 | 60 | 35 | 0 | 0 | 0 | 0 | 0 | 0 | 0 | 5 | 0 |
| 5 | 35 | 60 | 0 | 0 | 0 | 0 | 0 | 0 | 0 | 5 | 0 |
| 6 | 0 | 50 | 0 | 45 | 0 | 0 | 0 | 0 | 0 | 5 | 0 |
| 7 | 35 | 30 | 0 | 30 | 0 | 0 | 0 | 0 | 0 | 5 | 0 |
| 8 | 55 | 30 | 0 | 10 | 0 | 0 | 0 | 0 | 0 | 5 | 0 |
| 9 | 52 | 30 | 0 | 10 | 0 | 0 | 0 | 0 | 3 | 5 | 0 |
| 10 | 35 | 50 | 0 | 10 | 0 | 0 | 0 | 0 | 0 | 5 | 0 |
| 11 | 85 | 0 | 0 | 0 | 10 | 0 | 0 | 0 | 0 | 5 | 0 |
| 12 | 85 | 0 | 0 | 0 | 7 | 0 | 0 | 0 | 3 | 5 | 0 |
| 13 | 35 | 0 | 0 | 30 | 0 | 30 | 0 | 0 | 0 | 5 | 0 |
| 14 | 50 | 35 | 0 | 0 | 10 | 0 | 0 | 0 | 0 | 5 | 0 |
| 15 | 50 | 25 | 0 | 0 | 0 | 20 | 0 | 0 | 0 | 5 | 0 |
| 16 | 60 | 0 | 0 | 20 | 15 | 0 | 0 | 0 | 0 | 5 | 0 |
| 17 | 35 | 30 | 0 | 20 | 0 | 0 | 10 | 0 | 0 | 5 | 0 |
| 18 | 35 | 30 | 0 | 10 | 0 | 0 | 20 | 0 | 0 | 5 | 0 |
| 19 | 35 | 30 | 0 | 0 | 0 | 0 | 30 | 0 | 0 | 5 | 0 |
| 20 | 35 | 30 | 0 | 20 | 0 | 0 | 0 | 10 | 0 | 5 | 0 |
| 21 | 35 | 30 | 0 | 10 | 0 | 0 | 0 | 20 | 0 | 5 | 0 |
| 22 | 25 | 20 | 0 | 10 | 0 | 0 | 40 | 0 | 0 | 5 | 0 |
| 23 | 25 | 20 | 0 | 0 | 0 | 0 | 50 | 0 | 0 | 5 | 0 |
| 24 | 25 | 30 | 0 | 0 | 0 | 0 | 0 | 40 | 0 | 5 | 0 |

TABLE 2

| Examples | Film thickness (μm) | A layer raw material | B layer raw material |
|---|---|---|---|
| Example 1 | 50 | (B)/(E) | (A) |
| Example 2 | 50 | (B)/(E) | (A) |
| Example 3 | 50 | (B)/(E) | (A) |
| Example 4 | 50 | (B)/(E) | (A) |
| Example 5 | 50 | (B)/(E) | (A) |
| Example 6 | 50 | (B)/(E) | (A) |
| Example 7 | 50 | (B)/(E) | (A) |
| Example 8 | 50 | (B)/(E) | (A) |
| Example 9 | 50 | (B)/(E) | (A) |
| Example 10 | 50 | (B)/(E) | (A) |
| Example 11 | 50 | (B)/(E) | (A) |
| Example 12 | 50 | (B)/(E) | (A) |
| Example 13 | 50 | (B)/(E) | (A) |
| Example 14 | 50 | (B)/(E) | (A) |
| Example 15 | 50 | (B)/(E) | (A) |
| Example 16 | 50 | (B)/(E) | (A) |
| Example 17 | 50 | (B)/(E) | (A) |
| Example 18 | 50 | (B)/(E) | (A) |
| Example 19 | 50 | (B)/(E) | (A) |
| Example 20 | 50 | (B)/(E) | (A) |

TABLE 2-continued

| | | | |
|---|---|---|---|
| Example 21 | 50 | (B)/(E) | (A) |
| Example 22 | 50 | (B)/(E) | (A) |
| Example 23 | 50 | (B)/(E) | (A) |
| Example 24 | 23 | (D)/(E) | (D) |
| Example 25 | 50 | (D)/(E) | (D) |
| Example 26 | 125 | (D)/(E) | (D) |

| Examples | Thickness ratio A | Thickness ratio B | A | Coating solution | Coating layer thickness (μm) |
|---|---|---|---|---|---|
| Example 1 | 2.5 | 45 | 2.5 | 1 | 0.04 |
| Example 2 | 2.5 | 45 | 2.5 | 2 | 0.04 |
| Example 3 | 2.5 | 45 | 2.5 | 3 | 0.04 |
| Example 4 | 2.5 | 45 | 2.5 | 4 | 0.04 |
| Example 5 | 2.5 | 45 | 2.5 | 5 | 0.04 |
| Example 6 | 2.5 | 45 | 2.5 | 6 | 0.03 |
| Example 7 | 2.5 | 45 | 2.5 | 6 | 0.10 |
| Example 8 | 2.5 | 45 | 2.5 | 7 | 0.04 |
| Example 9 | 2.5 | 45 | 2.5 | 7 | 0.10 |
| Example 10 | 2.5 | 45 | 2.5 | 8 | 0.04 |
| Example 11 | 2.5 | 45 | 2.5 | 9 | 0.04 |
| Example 12 | 2.5 | 45 | 2.5 | 10 | 0.04 |
| Example 13 | 2.5 | 45 | 2.5 | 11 | 0.03 |
| Example 14 | 2.5 | 45 | 2.5 | 12 | 0.03 |
| Example 15 | 2.5 | 45 | 2.5 | 13 | 0.04 |
| Example 16 | 2.5 | 45 | 2.5 | 14 | 0.04 |
| Example 17 | 2.5 | 45 | 2.5 | 15 | 0.04 |
| Example 18 | 2.5 | 45 | 2.5 | 16 | 0.04 |
| Example 19 | 2.5 | 45 | 2.5 | 17 | 0.03 |
| Example 20 | 2.5 | 45 | 2.5 | 18 | 0.03 |
| Example 21 | 2.5 | 45 | 2.5 | 19 | 0.03 |
| Example 22 | 2.5 | 45 | 2.5 | 20 | 0.03 |
| Example 23 | 2.5 | 45 | 2.5 | 21 | 0.03 |
| Example 24 | 1.5 | 20 | 1.5 | 7 | 0.04 |
| Example 25 | 2.5 | 45 | 2.5 | 7 | 0.04 |
| Example 26 | 5 | 115 | 5 | 7 | 0.04 |

| Comparative Examples | Film thickness (μm) | A layer raw material | B layer raw material |
|---|---|---|---|
| Comparative Example 1 | 50 | (A)/(E) | (A) |
| Comparative Example 2 | 50 | (A)/(E) | (A) |
| Comparative Example 3 | 50 | (A)/(E) | (A) |
| Comparative Example 4 | 50 | (A)/(E) | (A) |
| Comparative Example 5 | 50 | (B)/(E) | (A) |
| Comparative Example 6 | 50 | (B)/(E) | (A) |
| Comparative Example 7 | 50 | (B)/(E) | (A) |
| Comparative Example 8 | 50 | (B)/(E) | (A) |

| Comparative Examples | Thickness ratio A | Thickness ratio B | A | Coating solution | Coating layer thickness (μm) |
|---|---|---|---|---|---|
| Comparative Example 1 | 2.5 | 45 | 2.5 | 1 | 0.04 |
| Comparative Example 2 | 2.5 | 45 | 2.5 | 2 | 0.04 |
| Comparative Example 3 | 2.5 | 45 | 2.5 | 6 | 0.03 |
| Comparative Example 4 | 2.5 | 45 | 2.5 | 11 | 0.03 |
| Comparative Example 5 | 2.5 | 45 | 2.5 | 22 | 0.03 |
| Comparative Example 6 | 2.5 | 45 | 2.5 | 23 | 0.03 |
| Comparative Example 7 | 2.5 | 45 | 2.5 | 24 | 0.03 |
| Comparative Example 8 | 2.5 | 45 | 2.5 | — | — |

TABLE 3

| Examples | Film haze (%) | Increase in haze ΔH (%) | Amount of ester cyclic trimer deposited (mg/m$^2$) | Adhesion property |
|---|---|---|---|---|
| Example 1 | 8.0 | 1.0 | 1.1 | B |
| Example 2 | 1.0 | 0.9 | 1.1 | B |
| Example 3 | 1.0 | 1.0 | 1.2 | B |
| Example 4 | 0.9 | 0.1 | 0.2 | B |
| Example 5 | 0.9 | 0.1 | 0.5 | A |
| Example 6 | 0.9 | 0.2 | 0.7 | A |
| Example 7 | 1.0 | 0.2 | 0.6 | A |
| Example 8 | 0.9 | 0.1 | 0.4 | A |
| Example 9 | 1.0 | 0.1 | 0.4 | A |
| Example 10 | 0.8 | 0.1 | 0.5 | A |
| Example 11 | 0.8 | 0.1 | 0.4 | A |
| Example 12 | 0.9 | 0.1 | 0.5 | A |
| Example 13 | 1.0 | 0.5 | 1.2 | A |
| Example 14 | 1.1 | 0.4 | 0.9 | B |
| Example 15 | 0.9 | 0.2 | 0.6 | B |
| Example 16 | 1.0 | 0.4 | 0.5 | A |
| Example 17 | 1.1 | 0.2 | 0.4 | A |
| Example 18 | 1.0 | 0.5 | 0.7 | B |
| Example 19 | 1.0 | 0.3 | 0.5 | A |
| Example 20 | 1.0 | 0.5 | 0.7 | A |
| Example 21 | 1.0 | 0.8 | 1.2 | A |
| Example 22 | 1.0 | 0.3 | 0.8 | A |
| Example 23 | 1.0 | 0.4 | 1.1 | A |
| Example 24 | 0.9 | 0.0 | 0.2 | A |
| Example 25 | 0.9 | 0.0 | 0.2 | A |
| Example 26 | 0.9 | 0.0 | 0.3 | A |
| Comparative Examples | | | | |
| Comparative Example 1 | 7.8 | 1.6 | 1.9 | B |
| Comparative Example 2 | 0.9 | 1.5 | 1.7 | B |
| Comparative Example 3 | 0.9 | 1.1 | 1.3 | A |
| Comparative Example 4 | 1.0 | 1.5 | 1.8 | A |
| Comparative Example 5 | 1.0 | 1.7 | 2.0 | A |
| Comparative Example 6 | 1.0 | 2.0 | 2.5 | A |
| Comparative Example 7 | 1.1 | 2.1 | 2.0 | A |
| Comparative Example 8 | 0.7 | 2.0 | 2.5 | D |

INDUSTRIAL APPLICABILITY

The coated film of the present invention can be suitably used, for example, as a base material for a transparent conductive laminate, in the applications requiring such a performance as to exhibit a less amount of an ester cyclic trimer deposited thereon, and have an excellent adhesion property to various functional layers, even after subjected to a severe heat treatment step in which the film is exposed to a high-temperature atmosphere for a long period of time.

The invention claimed is:
1. A coated film comprising:
a single-layer polyester film having an ester cyclic trimer content of not more than 0.7% by weight or a multi-layer polyester film comprising a polyester surface layer having an ester cyclic trimer content of not more than 0.7% by weight, and a coating layer formed on at least one surface of the single-layer polyester film or multilayer polyester film, wherein the coating layer is prepared from a coating solution consisting of at least one crosslinking agent as the sole nonvolatile component in the coating solution.

2. The coated film according to claim 1, wherein a thickness of the single-layer polyester film or multilayer polyester film is 10 to 300 μm, and a thickness of the surface layer of the multilayer polyester film is not less than 1.5 μm.

3. The coated film according to claim 1, wherein the polyester film has a multilayer structure having three layers constituted of two kinds of materials.

4. The coated film according to claim 1, wherein the at least one crosslinking agent is oxazoline or melamine.

5. The coated film according to claim 1, wherein the at least one crosslinking agent comprises combination of oxazoline and melamine.

6. The coated film according to claim 1, wherein the at least one crosslinking agent comprises combination of melamine, an oxazoline compound and an epoxy compound.

7. The coated film according to claim 1, wherein the at least one crosslinking agent comprises combination of melamine, a carbodiimide-based compound and an epoxy compound.

8. A coated film comprising:
    a single-layer polyester film having an ester cyclic trimer content of not more than 0.7% by weight or a multilayer polyester film comprising a polyester surface layer having an ester cyclic trimer content of not more than 0.7% by weight, and
    a coating layer that is prepared from a coating solution consisting of
        at least one crosslinking agent in an amount of not less than 85% by weight based on the weight of nonvolatile components in the coating solution and
        at least one selected from the group consisting of
            (1) a polymer selected from the group consisting of polyester resins, acrylic resins, polyvinyl resins, polyalkylene glycols, polyalkylene imines, methyl cellulose, hydroxy cellulose and starches,
            (2) particles and
            (3) at least one additive selected from the group consisting of a defoaming agent, a coatability improver, a thickening agent, an organic lubricant, an antistatic agent, an ultraviolet absorber, an antioxidant, a foaming agent, a dye and a pigment.

9. The coated film according to claim 8, wherein a thickness of the single-layer polyester film or multilayer polyester film is 10 to 300 μm, and a thickness of the surface layer of the multilayer polyester film is not less than 1.5 μm.

10. The coated film according to claim 8, wherein the polyester film has a multilayer structure having three layers constituted of two kinds of materials.

11. The coated film according to claim 8, wherein the at least one crosslinking agent is oxazoline or melamine.

12. The coated film according to claim 8, wherein the at least one crosslinking agent comprises combination of oxazoline and melamine.

13. The coated film according to claim 8, wherein the at least one crosslinking agent comprises combination of melamine, an oxazoline compound and an epoxy compound.

14. The coated film according to claim 8, wherein the at least one crosslinking agent comprises combination of melamine, a carbodiimide-based compound and an epoxy compound.

15. The coated film according to claim 8, wherein the at least one crosslinking agent in the coating solution is present in the amount of not less than 90% by weight based on the weight of nonvolatile components in the coating solution.

16. A coated film comprising:
    a single-layer polyester film having an ester cyclic trimer content of not more than 0.7% by weight or a multilayer polyester film comprising a polyester surface layer having an ester cyclic trimer content of not more than 0.7% by weight, and
    a coating layer formed on at least one surface of the single-layer polyester film or multilayer polyester film, wherein the coating layer is prepared from a coating solution consisting of at least one crosslinking agent and particles as the sole nonvolatile components in the coating solution.

* * * * *